April 17, 1951  A. T. C. DEAR  2,549,178
BALL AND SOCKET COUPLING
Filed Feb. 20, 1948
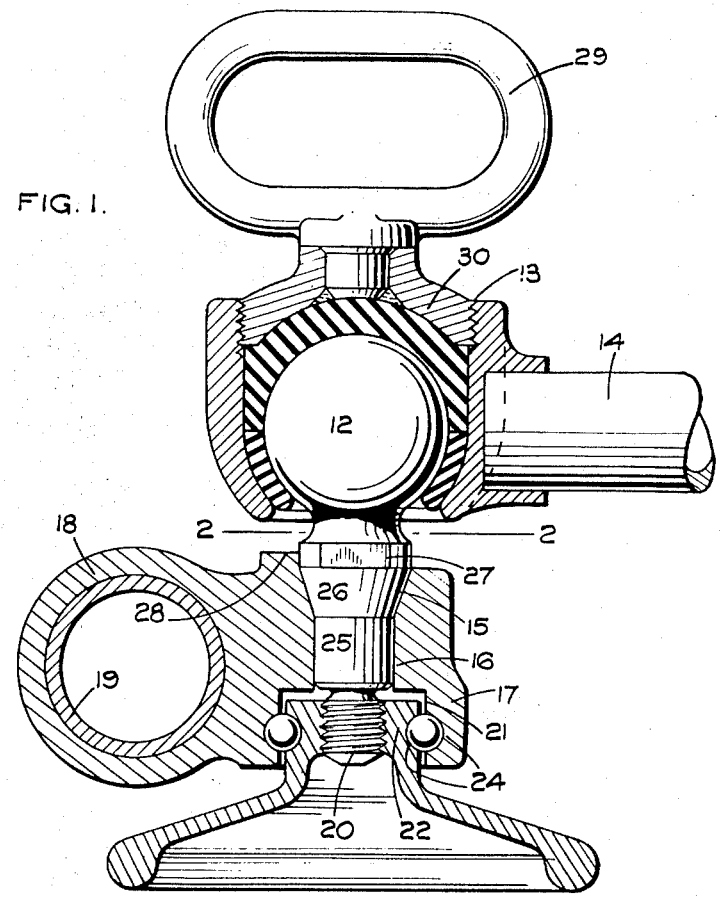
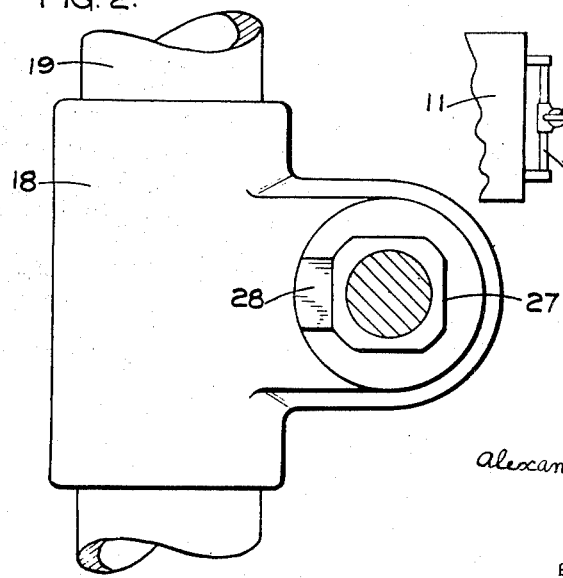
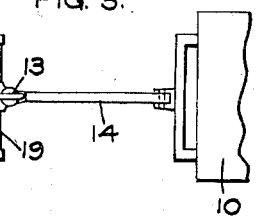
INVENTOR
Alexander Thomas Cameron Dear.
BY Tucker & Tucker
AGENTS.

Patented Apr. 17, 1951

2,549,178

UNITED STATES PATENT OFFICE 2,549,178

BALL-AND-SOCKET COUPLING

Alexander Thomas Cameron Dear, West Bromwich, England, assignor to J. Brockhouse & Company Limited, West Bromwich, England, a British company Application February 20, 1948, Serial No. 9,774
In Great Britain January 1, 1947

Section 1, Public Law 690, August 8, 1946
Patent expires January 1, 1967

3 Claims. (Cl. 280—33.17)

This invention relates to couplings for connecting two vehicles detachably together and more particularly for connecting a trailer vehicle to a tractor vehicle and of the kind comprising a pair of coupling members connected together so as to be relatively movable and each provided with an attachment member mounted or adapted to be mounted one on each vehicle. One form of coupling of this kind is described in my prior British specification No. 374,065 in which one of the coupling members comprises a ball, the other coupling member comprising a socket, the ball being secured detachably for engagement with the socket, by providing the latter with a spring loaded rotatable pin passing transversely across the mouth of the socket, the pin being provided on one side with a groove of substantial length so that in one position of the pin the groove is in register with the ball to permit of it being withdrawn from the socket and in another position the groove is out of register and the cylindrical part of the pin engages with the underside of the ball to retain it within the socket.

Another ball and socket coupling of the above kind is described in my prior British specification No. 410,095 in which the socket is made in two relatively movable parts so that to separate the vehicles it is again necessary to disconnect the ball from the socket.

One of the objects of the present invention is to provide an improved construction in which the two vehicles can be coupled or uncoupled without separation of the two members of the coupling.

A further object of the present invention is to provide an improved construction in which the two members of the coupling comprise ball and socket members in which the two vehicles can be coupled or uncoupled without separation of the ball member from its socket.

Referring to the drawings:

Figure 1 is a cross sectional side view of one form of vehicle coupling constructed in accordance with the present invention.

Figure 2 is a sectional view on the line 2—2 of Figure 1.

Figure 3 is a diagrammatic plan view showing the coupling in position connecting the two vehicles together.

In the drawings the invention is shown as applied to a coupling for connecting a road trailer vehicle, indicated at 10 in Figure 3, to a road tractor vehicle indicated at 11, and the coupling comprises ball and socket members 12, 13 constructed and secured together as described in my specification No. 9,773 of even date, now Patent 2,516,555 dated July 25, 1950, the socket member 13 being mounted on the forward end of the trailer drawbar 14 and the ball member having a dependent vertical integral shank 15 which extends through a hole 16 in an attachment member 17.

This attachment member is formed on its forward side with an integral transversely disposed horizontal cylindrical sleeve 18 which is mounted rigidly upon a transverse horizontal tube 19 which is strong in torsion, opposite ends of which tube are secured rigidly to the rear end of the tractor vehicle 11.

The ball shank 15 is formed at its lower end with a portion 20 of reduced cross section which is threaded externally and this projects into an enlarged portion 21 of the hole 16 in the attachment member, in which enlarged portion is rotatably and permanently mounted the boss 22 of a hand wheel 23, the boss being threaded externally so that it forms a nut which screws on to the lower end 20 of the ball shank.

The hand wheel is conveniently retained in position by forming the periphery of the boss and the interior of the enlarged part 21 with opposed part-circular grooves 24 in which are disposed a large number of balls so as substantially completely to fill the two grooves, the arrangement being similar to that described in my British patent specification No. 523,054, the attachment member 17 near its lower end being provided with a radial opening for positioning the balls in the grooves, which opening is closed by a removable threaded plug.

Alternatively, the hand wheel may be retained in position by a ring or circlip within the said groove 24.

Above its screwed end 20 the shank 15 is of cylindrical form, as indicated at 25, and the adjacent part of the hole 16 in the attachment member is of corresponding cross section so that the threaded end of the shank is located in the correct position in relation to the nut 22 prior to the connection of these two parts together.

In order to retain the ball member 12 tightly in position on the attachment member 17 when the parts have been assembled together, and in order to prevent rattle between the ball member and the attachment member, the shank 15 of the ball member above the cylindrical part 25 is made of frusto-conical form as indicated at 26, so that it tapers downwardly and the upper portion of the hole in the attachment member is of corresponding configuration so that when the hand wheel 23 is tightened the frusto-conical surfaces of the shank 15 and of the hole 16 are brought into tight engagement with one another, thereby preventing rattle between the two members. The angle of taper is steep enough to prevent the ball member and the attachment member from becoming wedged together in position.

Such a construction permits of wide manufacturing tolerances as it is not necessary for the cylindrical part 25 of the ball shank to engage closely with the adjacent part of the attachment member, such cylindrical part serving merely to guide the shank so that its screwed end is readily engageable with the hand wheel boss, the provision of the interengaging frusto-conical surfaces above referred to serving to take up any clearance when the hand wheel is finally tightened.

In order to prevent the ball shank from unscrewing from its retaining nut as a result, for example, of relative transverse movement between the vehicles tending to turn the ball on its attachment member, the upper end of the ball shank near its junction with the ball is made of non-circular section, as indicated at 27, and engages non-rotatably with an integral upstanding lug 28 on the attachment member adjacent the upper end of the hole therein.

Furthermore, the hand wheel may be provided with a suitable locking device to prevent it from rotating as a result of vibration during use, thereby retaining the ball member tightly in position on its attachment member.

When it is desired to uncouple the two vehicles it is merely necessary to turn the hand wheel 23 so as to unscrew the ball shank relative thereto, whereupon the ball member is projected upwardly in relation to the attachment member until its screwed end is disengaged from the hand wheel. The trailer can now be uncoupled from the tractor by merely grasping the handle 29 of the plug part 30 of the socket member 13 described in my specification No. 9,773 of even date, now Patent 2,516,555 dated July 25, 1950, so as to lift the ball shank entirely clear of its attachment member.

In order to prevent any damage of the screwed end of the ball shank when the vehicles are uncoupled the drawbar 14 or front end of the trailer 10 may be fitted with a rest or suitable support which retains the front end of the trailer at a sufficient height above the ground as to maintain the screwed end of the ball shank out of contact with the ground, thereby preventing damage thereto when the vehicles are disconnected.

A coupling constructed in accordance with the present invention possesses the advantage that the two vehicles can readily be coupled and uncoupled without the necessity of separating the ball and socket member of the coupling, thus permitting, if desired, of the ball and socket members being constructed as described in my specification No. 9,773 of even date, now Patent 2,516,555 dated July 25, 1950. In this construction the ball and socket members of the coupling are capable of being separated by unscrewing the plug part 30 of the socket member, so that the two members of the coupling may be regarded as being semi-permanently secured together, but if desired a construction in which the ball and socket members of the coupling are secured permanently together may be employed or the two members of the coupling may be of any other configuration in which it is not desired to separate the members after the parts have been assembled together.

What I claim then is:

1. In a tractor trailer vehicle assembly, a coupling for connecting the trailer vehicle to the tractor vehicle, said coupling comprising in combination a draw-bar connected at one end to the trailer vehicle, a socket coupling member on the other end of said draw-bar, said socket coupling member being open on its under side, a ball coupling member mounted permanently within the socket member and having limited universal movement relative to said socket member, a shank permanently and rigidly connected to said ball member and depending substantially vertically therefrom below said opening in said socket member, an attachment member on said tractor vehicle, said attachment member having a hole extending substantially vertically therethrough, said hole constituting a seating for said shank, said attachment member having a recess on its under side in alignment with said hole, a threaded extension to said shank disposed wholly within said recess, a nut mounted rotatably and permanently within said recess and adapted for operative engagement with the threaded extension of said shank, a dependent tubular portion on said nut serving to shield said threaded extension to said shank, and said dependent tubular portion being adapted peripherally to be gripped for the purpose of effecting rotation of said nut.

2. In a tractor trailer vehicle assembly, a coupling for connecting the trailer vehicle to the tractor vehicle, said coupling comprising in combination a draw-bar connected at one end to the trailer vehicle, a socket coupling member on the other end of said draw-bar, said socket coupling member being open on its under side, a ball coupling member mounted permanently within the socket member and having limited universal movement relative to said socket member, a shank permanently and rigidly connected to said ball member and depending substantially vertically therefrom below said opening in said socket member, an attachment member on said tractor vehicle, said attachment member having a hole extending substantially vertically therethrough, said hole constituting a seating for said shank, said attachment member having a recess on its under side in alignment with said hole, a threaded extension to said shank disposed wholly within said recess, a nut mounted rotatably and permanently within said recess and adapted for operative engagement with the threaded extension of said shank, a dependent tubular portion on said nut serving to shield said threaded extension to said shank, said dependent tubular portion being adapted peripherally to be gripped for the purpose of effecting rotation of said nut, a dependent tubular portion on said nut having an external frusto-conical configuration diverging outwardly and downwardly in relation to said shank axis and having a peripheral lip adapted manually to be gripped by the operator for the purpose of effecting rotation of said nut.

3. In a tractor trailer vehicle assembly, a coupling for connecting the trailer vehicle to the tractor vehicle, said coupling comprising in combination a draw-bar connected at one end to the trailer vehicle, a socket coupling member on the other end of said draw-bar, said socket coupling member being open on its under side, a ball coupling member mounted permanently within the socket member and having limited universal movement relative to said socket member, a shank permanently and rigidly connected to said ball member and depending substantially vertically therefrom below said opening in said socket member, said shank comprising an upper portion peripherally of non-circular form in cross section, a medial portion of frusto-conical configuration merging into a lower portion of cylindrical configuration, said attachment member having a hole extending substantially vertically therethrough, said hole constituting a seating for said shank, said seating being shaped to conform to the configuration on said medial and lower portion of said shank, said attachment member having a recess on its under side in alignment with said hole, a threaded extension on the lower end of said cylindrical portion of said shank disposed within said recess, means on said attachment member adapted to engage peripherally the upper non-circular portion of said shank, a nut mounted rotatably and permanently within said recess and adapted for operative engagement with the threaded extension of said shank, and means on said nut whereby it may be rotated to secure said shank detachably within said seating.

ALEXANDER THOMAS CAMERON DEAR.

REFERENCES CITED

The following references are of record in the file of this patent:

UNITED STATES PATENTS

| Number | Name | Date |
| --- | --- | --- |
| 1,875,930 | Martin | Sept. 6, 1932 |
| 1,896,717 | Mott | Feb. 7, 1933 |
| 1,986,149 | Harris | Jan. 1, 1935 |
| 2,144,401 | Buckellew | Jan. 17, 1939 |
| 2,297,182 | Weiss | Sept. 29, 1942 |
| 2,438,749 | Harrer | Mar. 30, 1948 |

FOREIGN PATENTS

| Number | Country | Date |
| --- | --- | --- |
| 444,106 | Great Britain | Mar. 5, 1936 |
| 725,351 | France | Aug. 23, 1933 |